Figure 1:
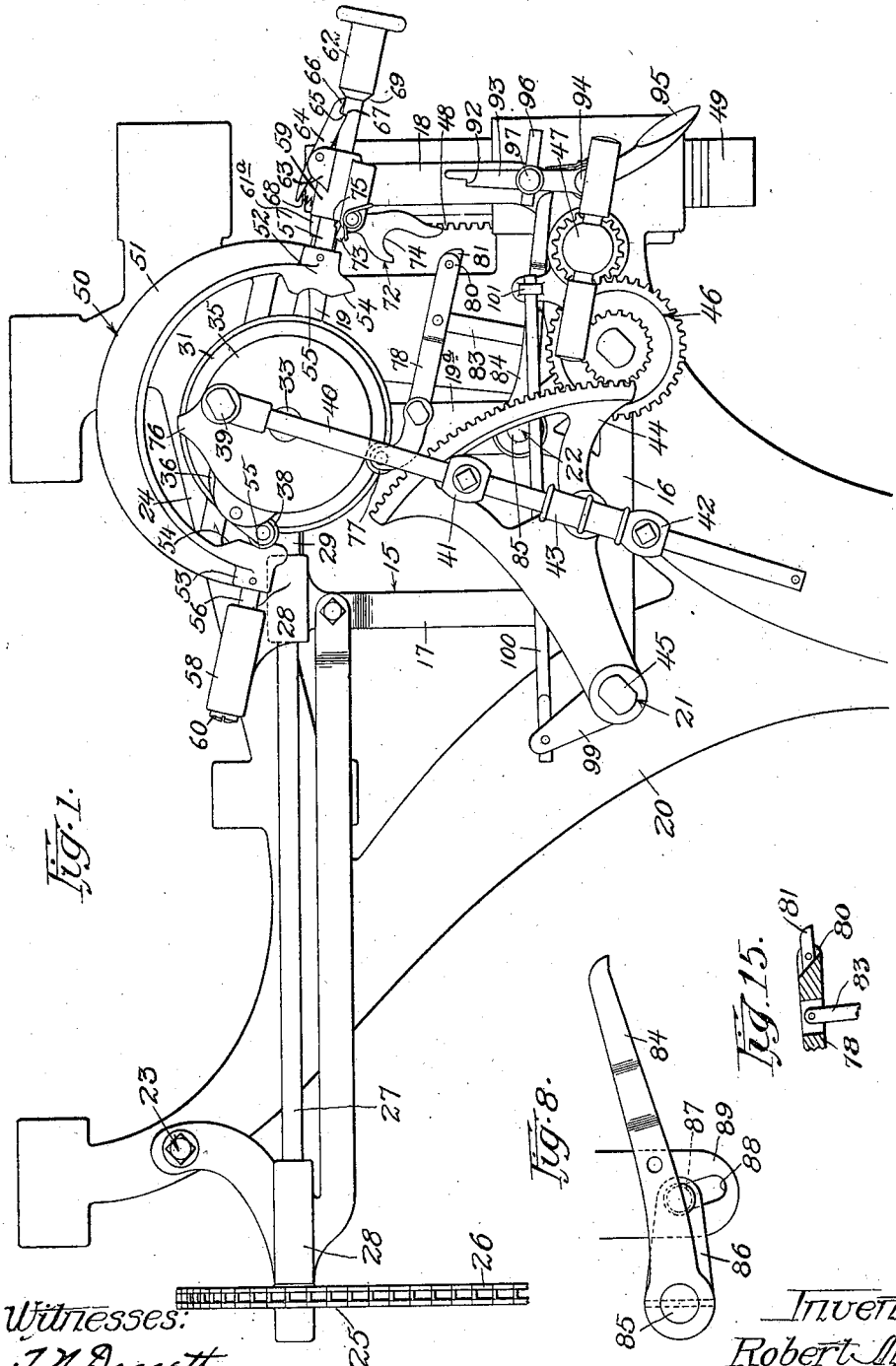

R. MILNE.
FEED MECHANISM FOR DRILL SPINDLES.
APPLICATION FILED MAY 20, 1910.

983,746.

Patented Feb. 7, 1911.
7 SHEETS—SHEET 1.

Witnesses:
J. N. Daggett.
Frank D. Blanchard

Inventor:
Robert Milne,
by Banning & Banning
Attys

R. MILNE.
FEED MECHANISM FOR DRILL SPINDLES.
APPLICATION FILED MAY 20, 1910.

983,746.

Patented Feb. 7, 1911.
7 SHEETS—SHEET 2.

Witnesses:
J. M. Daggett.
Frank S. Blanchard

Inventor:
Robert Milne.
by Banning & Banning
Attys.

R. MILNE.
FEED MECHANISM FOR DRILL SPINDLES.
APPLICATION FILED MAY 20, 1910.
983,746.
Patented Feb. 7, 1911.
7 SHEETS—SHEET 3.
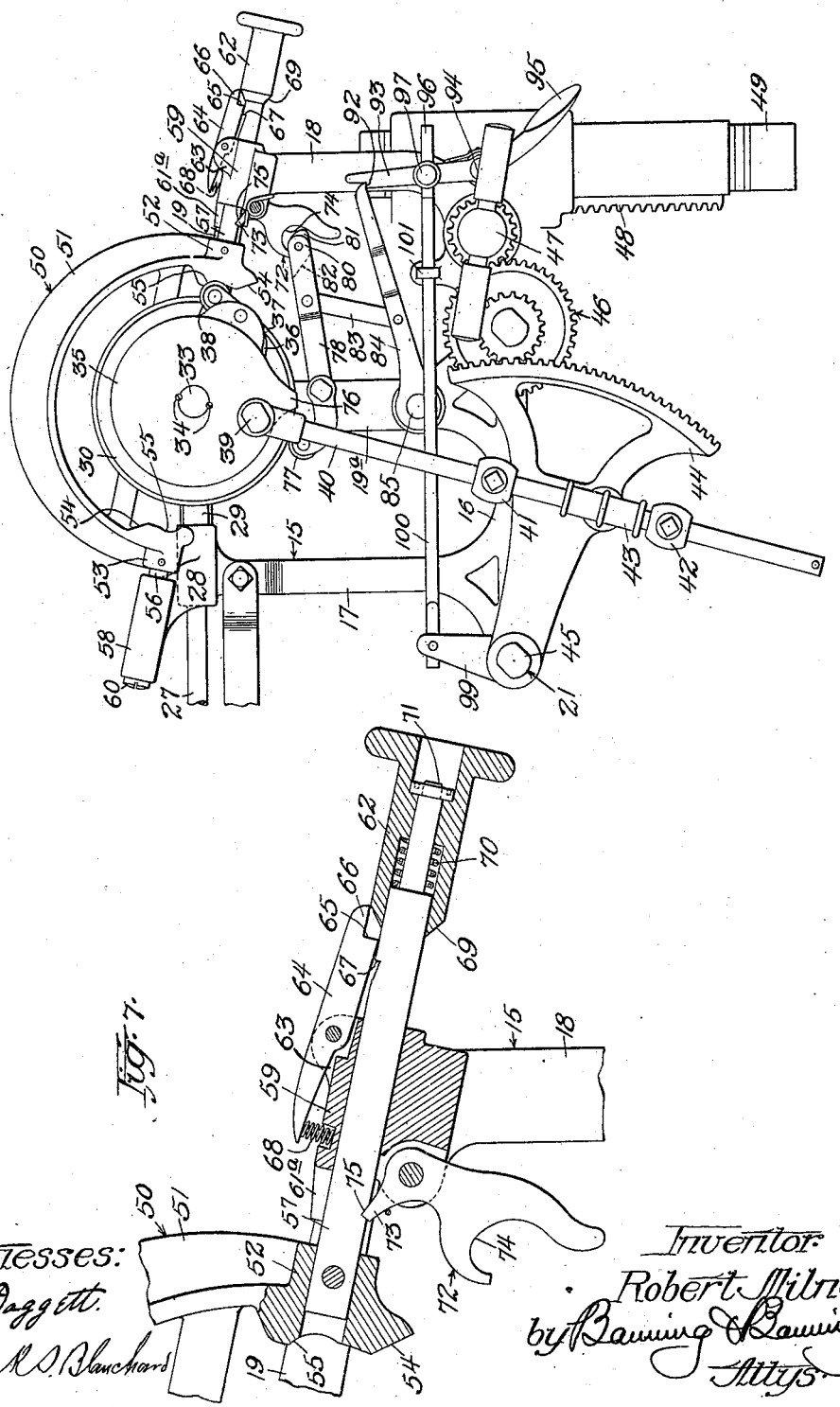
Witnesses:
J. M. Daggett.
Frank S. Blanchard.
Inventor:
Robert Milne.
by Banning & Banning
Attys.

R. MILNE.
FEED MECHANISM FOR DRILL SPINDLES.
APPLICATION FILED MAY 20, 1910.

983,746.

Patented Feb. 7, 1911.
7 SHEETS—SHEET 4.

Witnesses:
T. N. Daggett.
Frank S. Blanchard

Inventor:
Robert Milne.
by Banning & Banning
Attys.

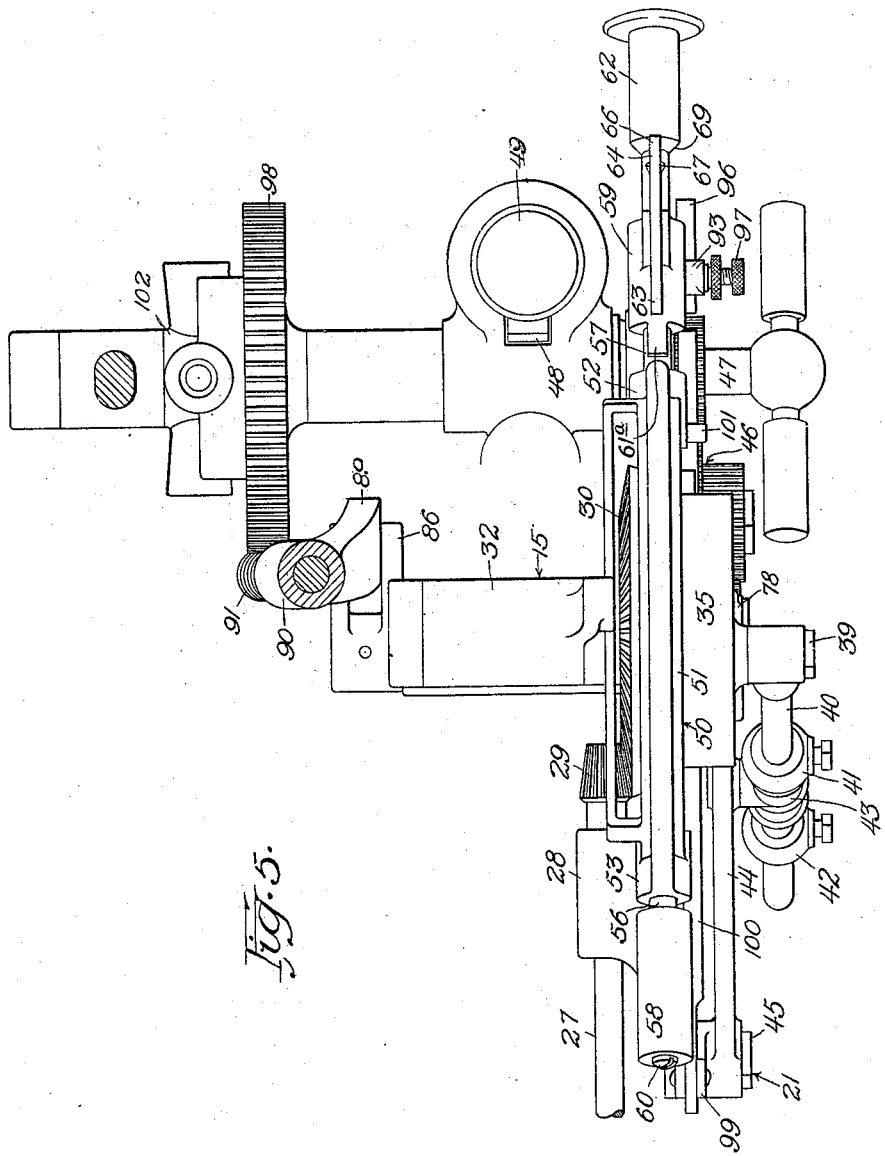

R. MILNE.
FEED MECHANISM FOR DRILL SPINDLES.
APPLICATION FILED MAY 20, 1910.

983,746.

Patented Feb. 7, 1911.
7 SHEETS—SHEET 6.

Witnesses:
J. N. Daggett.
Frank S. Blanchard

Inventor:
Robert Milne.
by Banning & Banning
Attys.

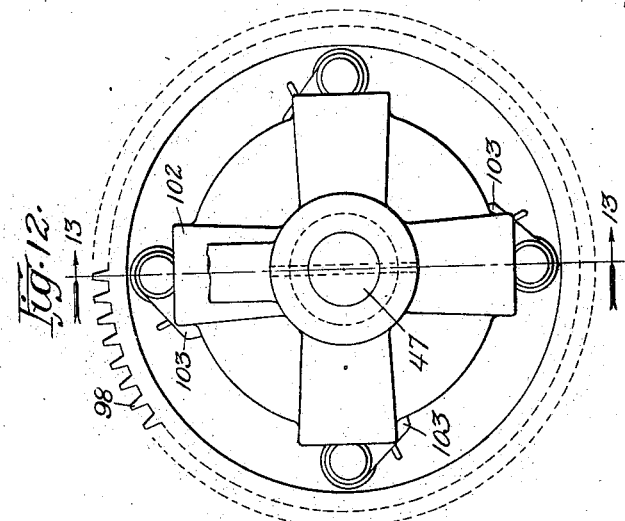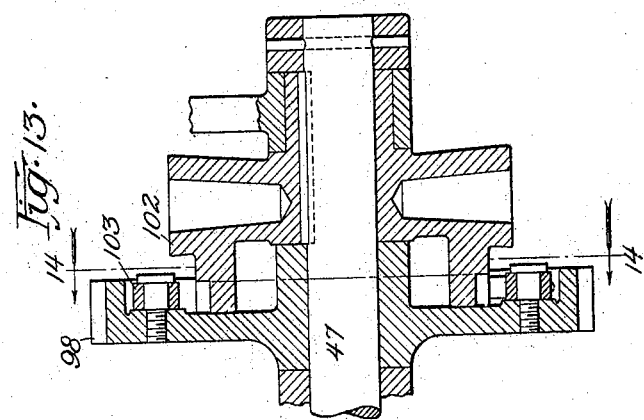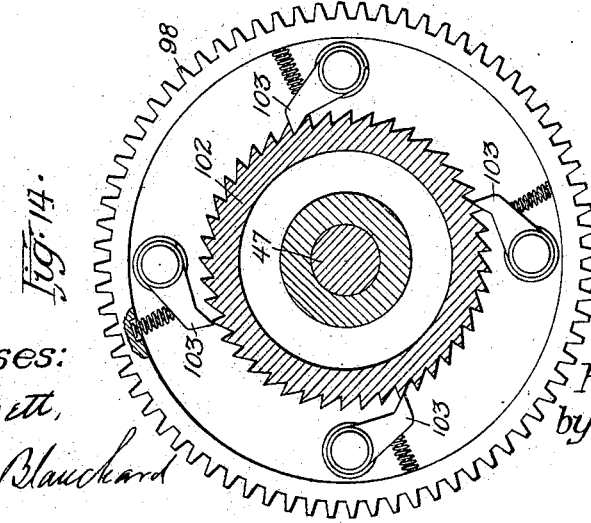

UNITED STATES PATENT OFFICE.

ROBERT MILNE, OF ROCKFORD, ILLINOIS, ASSIGNOR TO ROCKFORD DRILLING MACHINE COMPANY, OF ROCKFORD, ILLINOIS, A CORPORATION OF ILLINOIS.

FEED MECHANISM FOR DRILL-SPINDLES.

983,746.　　　　　Specification of Letters Patent.　　Patented Feb. 7, 1911.

Application filed May 20, 1910. Serial No. 562,456.

*To all whom it may concern:*

Be it known that I, ROBERT MILNE, a citizen of the United States, residing at Rockford, in the county of Winnebago, in the State of Illinois, have invented certain new and useful Improvements in Feed Mechanism for Drill-Spindles, of which the following is a specification.

This invention relates to means for automatically feeding the drill spindle down into position to engage the work; to means for automatically stopping the feeding when this point has been reached, and to means for automatically throwing into mesh the spindle-driving gearing which feeds the spindle through the work during the drilling operation, the throwing of said driving gear into mesh occurring just prior to the stopping of the feeding of the spindle into engagement with the work; to means for automatically throwing the spindle-driving gearing out of engagement after the spindle has been fed a predetermined distance through the work, and to means for automatically retracting the spindle out of the work to bring it back to normal position, the feeding of the spindle down to engagement with the work and the retracting of the spindle out of the work after the drilling operation being performed by mechanism carried upon an auxiliary frame adapted to be attached to the frame of the drill press.

The objects of the present invention are, to construct a mechanism for accomplishing the above result which can be applied to any form of drill, to centralize the mechanism and to mount it upon an independent frame, to actuate the clutch mechanism governing the feed of the drill by means of the shifting of a yoke member overlying said clutch mechanism, to provide means whereby the yoke member is automatically shifted to position to stop the feed of the drill spindle when it has been returned to normal position, to provide latch members for holding the yoke in either shifted position, to provide trigger mechanism actuated by the downward feed of the drill to release the clutch from locked position and feed the drill back to normal position, and means whereby one of the latch members and the trigger mechanism and the connection between said latch member and trigger mechanism are moved to one position by a member carried by the clutch mechanism, and means carried by the clutch mechanism for throwing the spindle-driving gearing into and out of engagement.

The invention further consists in the features of construction and combination of parts hereinafter described and claimed.

Figure 2:
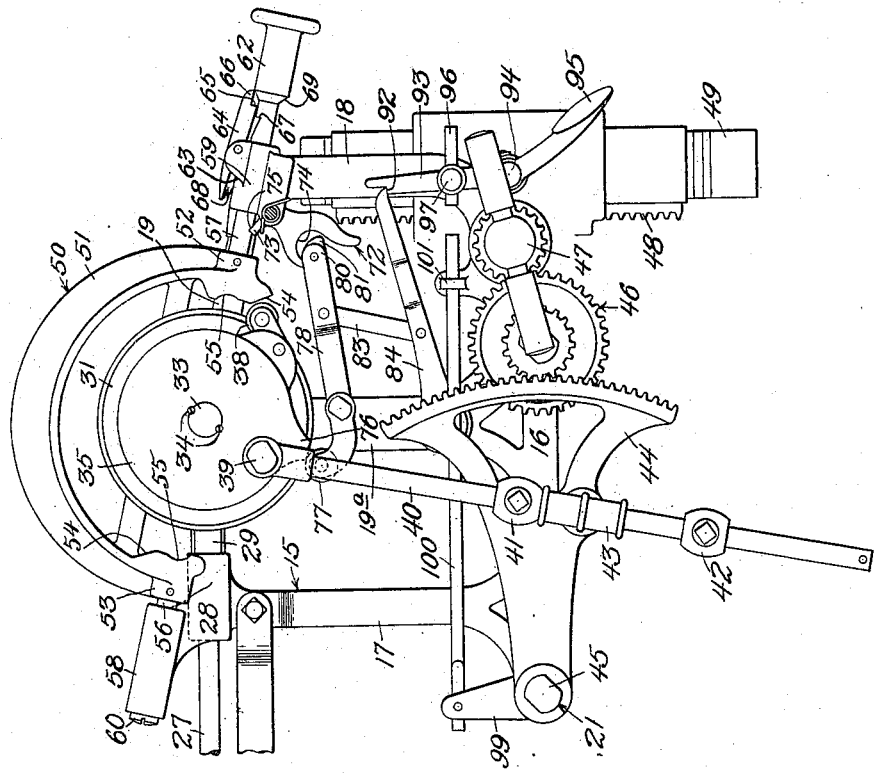
Figure 6:
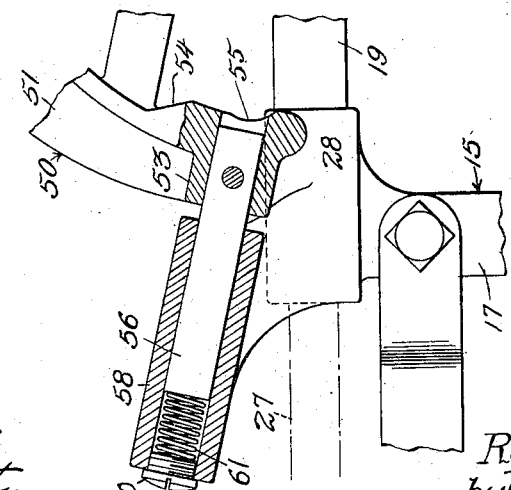
Figure 4:
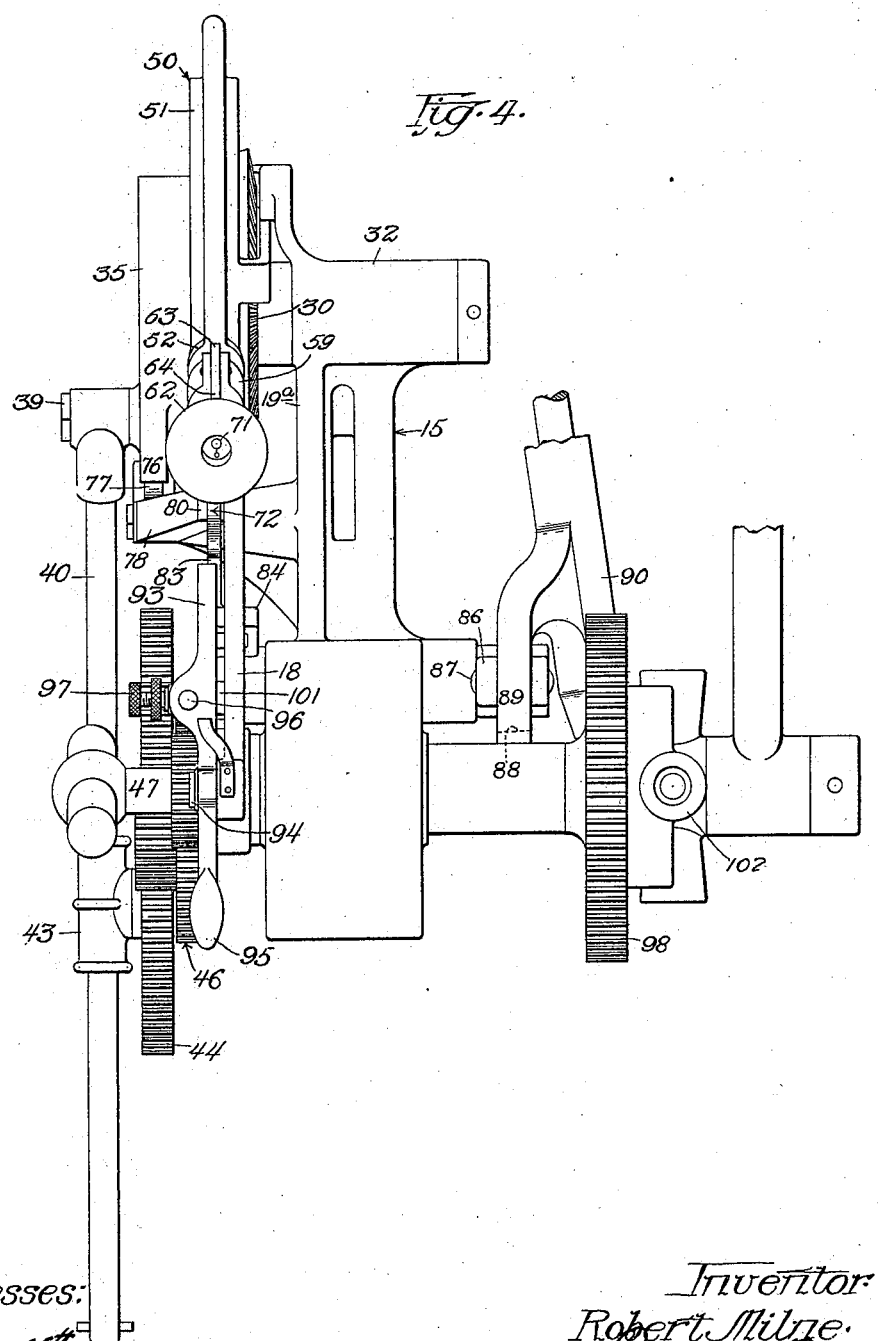
Figure 9:
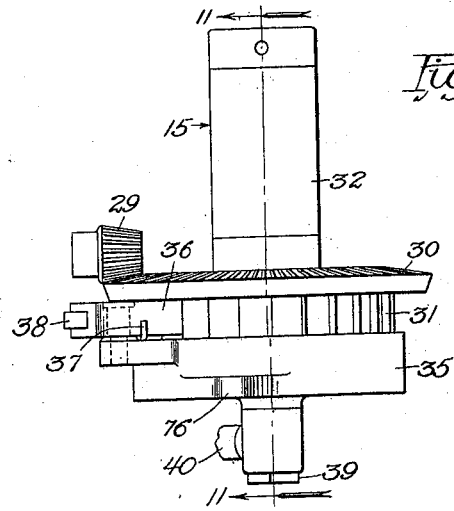
Figure 10:
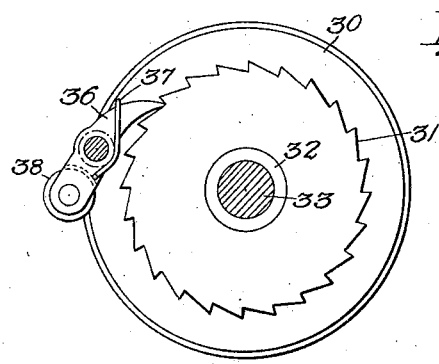
Figure 11:
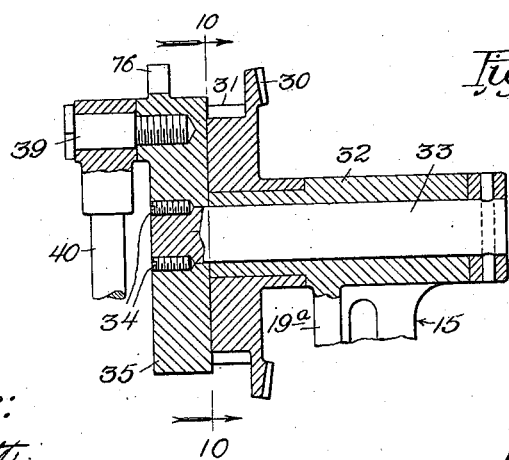

In the drawings—Figure 1 is a side elevation of the mechanism of the present invention in initial position, showing the connection between the clutch mechanism and the member driven from the main power shaft for actuating the clutch mechanism; Fig. 2, a detail showing the mechanism in position after it has fed the drill into position to contact the work; Fig. 3, a view showing the position of mechanism just prior to the tripping action for operating the same to withdraw the drill from the work; Fig. 4, a front view of the mechanism showing the connection to the spindle-driving gearing; Fig. 5, a plan view of the mechanism showing the connection to the spindle-driving gearing; Fig. 6, a detail of one end of the shiftable member; Fig. 7, a detail of the latch members; Fig. 8, a detail of the crank connection to the spindle-driving gearing for throwing the same into and out of mesh; Fig. 9, an elevation of the clutch mechanism; Fig. 10, a section on line 10—10 of Fig. 11; Fig. 11, a cross-section through the assembled clutch mechanism on line 11—11 of Fig. 9; Fig. 12, a face view of the gearing driven by the worm gear; Fig. 13, a cross section on line 13—13 of Fig. 12; and Fig. 14, a section on the line 14—14 of Fig. 13; and Fig. 15 a detail of the finger 81.

The feeding device is mounted upon a frame-work 15 comprising a lower rail 16, side rails 17 and 18, top rail 19, and an intermediate vertical rail 19ª. As will be seen from Fig. 1, where this framework is shown more clearly, in order to mount the same upon the framework 20 of the drill press it will only be necessary to tap holes at the points 21, 22 and 23 in the drill press frame and to connect the upper portion of the frame carrying the feeding device to the upper portion 24 of the drill press frame 20. Thus it will be possible to attach the frame carrying the feeding mechanism to the drill press frame by means of these four points of attachment. By this arrangement it is possible to place the framework carrying the feeding mechanism upon the framework of any style of drill press without changing the construction or configuration of either one. It is, of course, understood that the particular style of frame shown, as well as the manner described of securing the same to the frame of the drill press, can be varied, the point I desire to emphasize being that by utilizing a separate frame the feeding attachment can be placed on any drill press frame with the tapping of a minimum number of holes in the drill press frame to secure the feeding mechanism in position.

The mechanism is actuated from a driving wheel 25, which receives power through a sprocket chain 26 or in other suitable manner from the main power shaft of the drill press. The driving wheel 25 actuates a driving shaft 27, which is journaled within sleeves 28 carried upon the framework 15. The driving shaft 27 has positioned upon its end a pinion 29 best shown in Figs. 5 and 9. The pinion 29, as shown in Fig. 9, meshes with a gear 30, which is formed integral with a ratchet 31. The gear and ratchet are mounted exteriorly upon a sleeve 32 carried by the frame 16, and journaled in the interior of said sleeve is a shaft 33, to one end of which is secured, by locking pins 34 or otherwise, a disk 35. Said disk carries a dog 36 held normally by a spring 37 in engagement with teeth of the ratchet 31, as best shown in Fig. 10. The dog has pivotally mounted in its non-engaging end a roller 38 adapted, when contacted, to move the dog out of engaging position with the teeth of the ratchet 31. The pinion 29 and the gear 30, together with the ratchet 31, are continuously driven by the rotation of the shaft 27, and rotate independent of the disk 35, save when the dog 36 is thrown into engaging position with the teeth of the ratchet 31, the gear ratchet and dog constituting what will be hereinafter termed the clutch mechanism.

The disk 35 has pivotally secured thereto by means of a pin 39 a rod 40, which is provided at predetermined points upon its length with adjustable contact members 41 and 42. The adjustable contact members 41 and 42 are adapted to engage a sleeve 43 carried upon a toothed quadrant 44, which is pivotally mounted upon a shaft 45. The engaging of either one of the contact members 41 or 42 with the sleeve 43 serves to form a connection between the quadrant 44 and the disk 35, so that the movement of said disk will serve to swing the quadrant in one direction or the other, according to whether the rod 40 is moving in an upward or downward direction. The quadrant 40 communicates through a train of gearing 46 with a shaft 47, which carries a pinion (not shown) meshing with a rack 48 carried upon a drill spindle 49. This gearing and its connection to the quadrant, as well as the rack and pinion for actuating the drill spindle, are old and well known in the art and a detailed description thereof is not deemed necessary at the present time.

The movements of the dog 36 into and out of engagement with the teeth of the ratchet 31 is determined by the position of a shiftable member 50, which is in the form of a yoke 51 having its ends 52 and 53 extending approximately in alinement with the center of the disk 35, as shown in Figs. 1, 2 and 3. The yoke 51 is positioned to partially surround and overlie the clutch mechanism, thus centralizing this portion of the mechanism at one point. The ends 52 and 53 of the yoke member are each provided with a cam surface 54 and a recessed surface 55, and the yoke is provided with trunnions 56 and 57 extending outwardly from the ends thereof, which trunnions are mounted within sleeves 58 and 59 formed upon the frame 15.

The sleeve 58, as more clearly shown in Fig. 6, is provided at its upper end with a plug 60, between which and the end of the trunnion 56 is a coil spring 61. This spring serves to automatically shift the yoke in one direction, as will be more fully hereinafter explained, and a stop lug 61ᵃ is provided on the sleeve 59 as shown in Fig. 7 for limiting the movement of the yoke when it is automatically shifted by the action of the spring 61. The trunnion 57 extends through the sleeve or hub 59 and carries upon the outer end thereof a slidably mounted knob 62, best shown in Fig. 7.

Mounted between ears 63 carried upon the upper surface of the sleeve 59 is a latch member 64, provided with a locking shoulder 65 and a rounded outer end 66, and when the yoke 51 is moved into the position shown in Fig. 1 the locking shoulder 65 will engage with the face of a notch 67 formed in the trunnion 57, and the latch member is held normally in engagement therewith by means of a spring 68 or other suitable devices. This latch serves to prevent movement of the yoke when the roller 38 strikes the cam surface 54 of the end 53, as, of course, in order to have the cam surface perform the function of withdrawing the dog 36 from engagement with the teeth of the ratchet 31 the yoke must be held against movement so that the contacting of the roller with the end thereof will not merely force the yoke away from the roller and permit it to pass by without effecting the disengagement of the dog.

The knob 62 terminates in a beveled surface 69, which is held normally outward by means of a spring 70 positioned therein, as best shown in Fig. 7. The knob is retained upon the trunnion 57 by means of a cap 71 or other suitable device, and with the parts as shown in Fig. 1 the initial movement inward of the knob 62 will bring the beveled surface 69 thereof into engagement with the end of the latch 64 and raise the latch to force its locking shoulder 65 free from engagement with the knob 67. A further movement inward of the knob will cause said knob to engage with the trunnion 57, so that the knob and trunnion will move in unison and shift the yoke 51 into the position shown in Figs. 2 and 3.

Mounted on the sleeve 59 is a latch member 72 provided with a locking end 73 and formed with a recess 74 located below said locking end. The locking end 73 is normally held in engagement with the surface of the trunnion 57 by spring pressure, and when said trunnion is moved by the operation of the knob 62, as heretofore described, the locking end 73 of the latch 72 will enter a notch 75 in the trunnion 57, thus holding the yoke in its shifted position against the tension of the spring 61 and preventing movement of the yoke when the end 52 thereof is contacted by the roller 38. Thus with the parts as shown in Fig. 1, a movement of the knob 62 will shift the yoke member so as to move the recessed portion 55 of the end 53 away from the roller 38 and permit the dog 36 to engage with the teeth of the ratchet 31 and establish a connection between the disk 35 and the gear 30 rotating said disk, and moving the rod 40 downward, which movement will cause the contact 41 to move downward, engaging the sleeve 43 and actuating the segment 44 and the gear connection 46, and, through the movement of said gear connection, the pinion on the shaft 47 is rotated, acting on the rack 48 to move the drill spindle downward into position to engage the work.

When the yoke 51 is shifted in the manner above described, the end 52 will be moved in the position shown in Fig. 2, where the cam surface 54 will contact the roller 38 when the disk 35 has been rotated sufficiently to bring the roller 38 into position to be contacted by said cam surface. This contact will move the dog out of engagement with the teeth of the ratchet 31 and arrest the movement of the disk 35 and the rod 40. The mechanism will then be in the position shown in Fig. 3, in which the roller 38 is in engagement with the recessed portion 55 of the end 52 of the yoke, and the locking end 73 of the latch 72 will be in engagement with the notch 75 in the trunnion 57, holding the yoke in such shifted position while the spindle is being fed down into engagement with the work.

The disk 35 has formed thereon a contact 76, which, when the disk has been rotated a predetermined distance, will engage with a roller 77 upon a link or bar 78 pivoted to the intermediate rail 19ª of the frame 15. When the roller 77 is engaged by the contact 76, the end 80 of the link 78 is moved into position so that a finger 81, carried upon the end thereof, lies within the recessed portion 74 of the latch 72, as best shown in Fig. 2. This finger 81, as shown in Fig. 3, is provided with a beveled face 82, so that when the arm 78 is swung upward the finger 81 will ride over the lower end of the latch member 72, but when the arm 78 is swung downward the finger will then engage the projecting portion of the latch 72 and act against the same to swing the latch and bring the locking end 73 thereof out of engagement with the recess 75. This rigidity of the finger 81 during the downward movement of the arm 78 is due to the beveled formation of its inner end.

The link 78 is connected by a strap 83 to a lever or bar 84 mounted upon a stub shaft 85. The stub shaft carries upon the opposite end thereof a crank arm 86, shown in Figs. 4, 5 and 8, which crank arm has a pin 87 engaging a slot 88 in a lug 89 extending from the sleeve 90 carrying a worm 91 which forms a part of the spindle-driving gearing, this connection between the crank arm 86 and the lug 82 being best shown in Fig. 8. The bar 84 and the crank arm 86 both being secured to the shaft 85, movement of the bar 84 will actuate said crank arm to throw the worm 91 into and out of engagement with the driven portion of the spindle-driving gearing. The free end of the bar or lever 84 is adapted to engage, with the parts as shown in Fig. 3, with a notch 92 formed in the upper end of a trigger 93, which is pivoted at 94 and is provided with a handle 95 and a contact pin 96, which pin may be adjusted by means of a set-screw 97 or other suitable device.

Carried upon the quadrant 44 is a crank arm 99, having attached thereto a rod 100, which is guided in its movements by means of an eye 101 formed upon the framework 15. This rod serves as a contact for tripping the trigger 93 when the drill has been fed the distance desired into the work.

The worm 91 is adapted to mesh with a worm wheel 98, which imparts movement to the shaft 47 through the medium of a clutch member 102, best shown in Figs. 12, 13 and 14. The gear 98 carries upon its interior a plurality of dogs 103, which are positioned so that each dog engages a different tooth of the ratchet at a different point from the edge thereof.

By means of this construction a slip connection is maintained between the worm wheel 98 and shaft 47, and at the same time when the gear 91 is thrown into mesh with the gear 98 no lost motion will result, as one of the dogs will act instantaneously upon one of the teeth of the ratchet member to produce the clutch connection between said ratchet member and the gear 98. This feature, however, is shown and described merely for the purpose of facilitating the description of the operation of the spindle feed, and is old and well known in the art and not claimed as a part of the present invention.

The operation will be understood from the foregoing, but briefly is as follows: With the parts as shown in Fig. 1, which is the starting position, the knob 62 is moved inwardly, releasing the latch 64 from engagement with the trunnion 57 and shifting the yoke 51 into position to release the roller 38 from engagement with the recess 55 in the end 53 of the yoke, thus permitting the dog 36 to engage the teeth of the ratchet 31, establishing a clutch connection between the disk 35 and the gear 30 rotating the disk, and moving the rod 40 downward. The contact 41 will move downward with the rod until it engages the sleeve 43 on the segment 44, after which the segment will be rocked around the shaft 45, imparting movement to the gearing 46 and moving the drill spindle down into engagement with the work. It will be understood that upon the initial movement of the yoke 51 by means of the actuation of the knob 62 the locking end 73 of the trigger 72 will be brought into engagement with the notch 75, so that the yoke is maintained in its shifted position during the movemnt of the rod 40 from the position shown in Fig. 1 to that shown in Fig. 2. The position of the stop member 41 will be regulated according to the thickness of the work, so that the spindle will be lowered a greater or less distance as desired, as, of course, when the work is of a substantially thin nature the spindle will have to be further depressed to be brought into engagement therewith than would be the case if the work were of a thick nature. When the spindle is in position to engage the work, the parts will be as shown in Fig. 2, at which time the contact 76 of the disk 35 will have engaged the roller 77 and swung the arm 78 upward, carrying with it the arm 84 and positioning the finger 81 within the recess 74 of the latch member 72 and bringing the end of the lever 84 into engagement with the notch 92 of the trigger 93. Simultaneously with the movement of the levers 78 and 84 into the position shown in Figs. 2 and 3, the shaft 85 will be rocked to actuate the crank arm 86 and move the lug 89 to bring the driving worm into engagement with the driven worm wheel, and when the parts are in the position for effecting the engagement of the driving worm with the driven worm wheel the roller 38 will have reached the point shown in Fig. 2, where it is about to engage with the cam surface 54 of the end 52 to retract the dog from engagement with the teeth of the ratchet 31 and break the clutch connection between the disk 35 and the gear 30 and stop further movement of the disk. The action of stopping the disk and of throwing the driving worm into engagement with the driven worm will be practically simultaneous, although the worm must, of course, be thrown in prior to the stopping of the disk. The movement, however, of the spindle by the segment will be faster than the movement of the spindle by means of the driving and driven worm, hence the ratchet 102 will be rotated faster for a certain length of time than the driven worm wheel 98. This, however, will be accommodated by means of the slip motion produced by the dogs and ratchets, and when one of the dogs 103 finally engages the teeth of the ratchet 102 the spindle will then be fed through the work by means of the driving and driven worms. The segment will be lowered through the movements of the gear connected to the spindle until the free end of the rod 100 is brought into engagement with the end of the stop pin 96, when the trigger 93 will be tripped, releasing the bar 84 to permit it to swing downward, rocking the stub shaft 85 and swinging the crank arm 86, moving the lug 89 to throw the driving worm out of mesh with the driven worm and, through the medium of the link 83, the movement of the bar 84 downward will swing the bar 78 downward, causing the finger 81 to engage with the latch 72, withdrawing the locking end 73 thereof from engagement with the notch 75 and releasing the yoke, whereby it is shifted into the position shown in Fig. 1 through the action of the spring 61. This releases the roller 38 from engagement with the recess 55 in the end 52 and permits the dog 36 to engage with the teeth of the ratchet 31, throwing the ratchet and disk 35 into clutch connection and rotating the disk through the medium of the gear 30 and pinion 29, drawing the lever 40 upward, which upward movement will bring the contact member 42 into engagement with the sleeve 43 of the segment 44, swinging the segment in an upward direction and reversing the movement of the gear connection 46, so that the pinion on the shaft 47 will act upon the rack 48 to draw the spindle upward and remove the tool from the work. The distance which the tool will be drawn upward will be governed by the position of the contact 42 on the rod 40, and the distance which the spindle will be advanced into the work before the driving worm is thrown out of engagement with the driven worm will be determined by the position of the pin 96 carried on the trigger 93. Thus the mechanism is capable of adjustment as to downward movement of the spindle, upward movement of the spindle, and as to the distance which the drilling tool will be advanced into the work.

I claim:

1. In a feed mechanism for drill spindles, the combination with the drill spindle of clutch mechanism comprising a driving member and a driven member normally in clutch with each other, means including a shiftable yoke having oppositely disposed acting ends for respectively throwing the driving member out of clutch with the driven member when the spindle has reached separated predetermined positions with respect to the work, mechanism operatively connected to the drill spindle for raising and lowering the same, and a member directly connected to the driven member of the clutch mechanism and operatively connected to the mechanism for raising and lowering the spindle, substantially as described.

2. In feed mechanism for drill spindles, the combination of clutch mechanism comprising a driving member and a driven member, a locking member for throwing the driving member into and out of clutch with the driven member, a shiftable member overlying the clutch mechanism and means operatively connected thereto to move said shiftable member into position to actuate said locking member when the drill spindle has reached a predetermined position with respect to the work, mechanism operatively connected to the drill spindle for raising and lowering the same, and a member carried by the driven member of the clutch mechanism and operatively connected to the mechanism for raising and lowering the spindle, substantially as described.

3. In feed mechanism for drill spindles, the combination of a driving shaft, a member upon one end of said driving shaft operatively connected to the main power shaft, clutch mechanism located adjacent the other end of said shaft and comprising a driving member actuated by the driving shaft and a driven member, a locking member for throwing the driving and driven member into and out of clutch, a shiftable member overlying the clutch member, and means operatively connected thereto to move said shiftable member into position to actuate said locking member when the drill spindle has reached a predetermined position with respect to the work, mechanism operatively connected to the drill spindle for raising and lowering the same, and a connection between the spindle operating mechanism and the driven member whereby the movement of the driven member a predetermined distance serves to vertically move the spindle a predetermined distance in one direction, substantially as described.

4. In feed mechanism for drill spindles, the combination of clutch mechanism comprising a driving member and a driven member, a locking member for throwing the driving member into and out of clutch with the driven member, a shiftable member overlying the clutch mechanism and means operatively connected thereto to move said shiftable member into position to actuate said locking member when the drill spindle has reached a predetermined position with respect to the work, tension mechanism for automatically moving said shiftable member in one direction, mechanism operatively connected to the drill spindle for raising and lowering the same, and a member carried by the driven member of the clutch mechanism and operatively connected to the mechanism for raising and lowering the spindle, substantially as described.

5. In feed mechanism for drill spindles, the combination of a driving shaft, a member upon one end of said driving shaft operatively connected to the main power shaft, clutch mechanism located adjacent the other end of said shaft and comprising a driving member actuated by the driving shaft and a driven member, a locking member for throwing the driving and driven member into and out of clutch, a shiftable member overlying the clutch member, means operatively connected thereto to move said shiftable member into position to actuate said locking member when the drill spindle has reached a predetermined position with respect to the work, tension mechanism for automatically moving said shiftable member in one direction, mechanism operatively connected to the drill spindle for raising and lowering the same, and a connection between the spindle operating mechanism and the driven member whereby the movement of the driven member a predetermined distance serves to vertically move the spindle a predetermined distance in one direction, substantially as described.

6. In feed mechanism for drill spindles, the combination of clutch mechanism comprising a driving member and a driven member, a toothed member carried by the driving member, a dog carried by the driven member adapted to engage the toothed member and lock the driving and driven members together, a yoke overlying said clutch mechanism, companion contacts upon said yoke adapted to withdraw and hold said dog from engaging position, means operatively connected for moving said yoke when the drill spindle has reached a predetermined position with respect to the work, a movement of said yoke in either direction moving one of said contacts into position to engage the dog and moving the other contact out of engagement with the dog, mechanism operatively connected for raising and lowering the drill spindle, and a connection between the driven member of the clutch mechanism and the spindle operating mechanism, substantially as described.

7. In feed mechanism for drill spindles, the combination of clutch mechanism comprising a driving member and a driven member, a toothed member carried by the driving member, a dog carried by said toothed member adapted to engage with said toothed member and lock the driving and driven members together, a yoke overlying said clutch mechanism and having its end terminating in substantial alinement with the center of the clutch mechanism, cam surfaces upon the free ends of the yoke member adapted to contact and withdraw and hold said dog from engaging position, means operatively connected for moving said yoke member when the drill spindle has reached a predetermined position with respect to the work, a movement of said yoke member in either direction moving one of said cam surfaces into position to engage the dog and moving the other cam surface out of engagement with the dog, mechanism operatively connected for raising and lowering the drill spindle, and a connection between the driven member of the clutch mechanism and the spindle operating mechanism, substantially as described.

8. In feed mechanism for drill spindles, the combination of clutch mechanism comprising a driving member and a driven member, a toothed member carried by the driving member, a dog carried by the driven member adapted to engage with the toothed member to lock the driving and driven members together, a yoke overlying said clutch mechanism, companion contacts upon said yoke adapted to withdraw and hold said dog from engaging position, means operatively connected for moving said yoke member when the drill spindle has reached a predetermined position with respect to the work, tension mechanism for automatically moving the yoke in one direction, a movement of said yoke member in either direction moving one of said contacts into position to engage the dog and moving the other contact out of engagement with the dog, mechanism operatively connected for raising and lowering the drill spindle, and a connection between the driven member of the clutch mechanism and the spindle operating mechanism, substantially as described.

9. In feed mechanism for drill spindles, the combination of clutch mechanism comprising a driving member and a driven member, a toothed member carried by the driving member, a dog carried by the driven member adapted to engage with the toothed member and lock the driving and driven members together, a yoke overlying said clutch and having its end terminating in substantial alinement with the center of the clutch mechanism, cam surfaces upon the free ends of the yoke member adapted to withdraw and hold said dog from engaging position, means operatively connected for moving said yoke member when the drill spindle has reached a predetermined position with respect to the work, tension mechanism for automatically moving the yoke in one direction, locking mechanism for preventing movement of the yoke out of either thrown position, a movement of said yoke member in either direction moving one of said cam surfaces into position to engage the dog and moving the other cam surface out of engagement with the dog, mechanism operatively connected for raising and lowering the drill spindle, and a connection between the driven member of the clutch mechanism and the spindle operating mechanism, substantially as described.

10. In feed mechanism for drill spindles, the combination of clutch mechanism comprising a driving member and a driven member, a dog carried by the driven member for locking the driving and driven members together, a yoke overlying the clutch mechanism and having its ends in substantial alinement with the center of the clutch mechanism, a cam surface on each end of the yoke adapted to contact and withdraw said dog from locking engagement, outwardly extending trunnions on either end of the yoke member, a frame on which said feed mechanism is mounted, sleeves on the frame forming a bearing for said trunnions, means for shifting the yoke from its initial position, a spring for automatically shifting the yoke back to its initial position, said shifting of the yoke occurring when the spindle has reached a predetermined position with respect to the work, latch members for holding the yoke in either shifted position, means for releasing the latch members, mechanism operatively connected to the drill spindle for moving it up and down, and a connection between the drill operating mechanism and the driven clutch member, substantially as described.

11. In feed mechanism for drill spindles, the combination of clutch mechanism comprising a driving member and a driven member, a dog carried by the driven member for locking the driving and driven members together, a yoke overlying the clutch mechanism and having its ends in substantial alinement with the center of the clutch mechanism, a cam surface on each end of the yoke adapted to contact and withdraw said dog from locking engagement, outwardly extending trunnions on either end of the yoke member, a frame on which said feed mechanism is mounted, sleeves on the frame forming a bearing for said trunnions, means for shifting the yoke from its initial position, a spring in one of said sleeves for automatically shifting the yoke back to its initial position, said shifting of the yoke occurring when the spindle has reached a predetermined position with respect to the work, latch members for holding the yoke in either shifted position, said latch members being mounted upon the other of said sleeves and engaging with notches in one of said trunnions and held normally in engaging position by spring tension, means for releasing the latch members, mechanism operatively connected to the drill spindle for moving it up and down, and a connection between the drill operating mechanism and the driven clutch member, substantially as described.

12. In feed mechanism for drill spindles, the combination of clutch mechanism comprising a driving member and a driven member, a connection between the driven member and the spindle whereby the spindle is fed up and down by the movements of the driven member, a movable member for locking the members of the clutch mechanism together, a yoke overlying the clutch mechanism, means for shifting the yoke, oppositely disposed contacts on the yoke member adapted to engage and withdraw the locking member from locking position, a mounting for said yoke, a trigger, a member adapted to contact and trip said trigger after the drill spindle has been fed a predetermined distance into the work, a connection between the trigger and the yoke whereby the tripping of the trigger will shift the yoke and throw one contact out of engagement with the locking member and the other contact into position to engage the locking member, and means for returning the yoke and trigger to normal position, substantially as described.

13. In a device of the class described, the combination of clutch mechanism comprising a driving member and a driven member, a shiftable member, a locking member for throwing said driving and driven member into and out of clutch, said locking member being withdrawn and held from locked position by contact with the shiftable member, latch members for holding said shiftable member in either thrown position, a slidable knob adapted on its initial movement to release one of the latch members from engagement and upon a further movement to move the shiftable member whereby one portion of said member is released from engagement with said locking member, permitting the locking member to move into position to throw the driving and driven members into clutch, said movement of the shiftable member moving another portion into position to engage the locking member when the driven member has rotated a predetermined distance, mechanism operatively connected to the drill spindle for raising and lowering the same, a connection between the spindle operating mechanism and the driven member of the clutch, a connection between the spindle operating mechanism and one of the latch members whereby said latch is released from locking position after the spindle has moved a predetermined distance in one direction, permitting the yoke to shift to its initial position and again permitting the locking member to move into position to throw the driving and driven members of the clutch mechanism into clutch, substantially as described.

14. In feed mechanism for drill spindles, the combination of clutch mechanism comprising a driving member and a driven member, a shiftable member adapted upon each movement thereof to permit the driving and driven members of the clutch mechanism to rotate in unison a predetermined distance, a connection between the driven member and the drill spindle, means for initially moving the shiftable member, a latch for holding it in such shifted position, a trigger, a connection between the trigger and the latch, and a movable contact actuated by the movement of the drill spindle for tripping said trigger, substantially as described.

15. In feed mechanism for drill spindles, the combination of clutch mechanism comprising a driving member and a driven member, a shiftable member adapted upon each movement thereof to permit said driving and driven members to rotate in unison a predetermined distance, a connection between the driven member and the drill spindle, means for initially moving the shiftable member to permit the clutch mechanism to initially operate and feed the spindle down to the work, gearing for feeding the spindle during the drilling operation, means for throwing said gearing into mesh prior to the stopping of the initial movement of the clutch mechanism, a trigger, a latch for holding the shiftable member in its initially thrown position, a connection between the trigger and the latch, means for tripping the trigger after the drill has been fed a predetermined distance through the work to release the latch and allow the shiftable member to return to normal position and permit the clutch mechanism to actuate and return the spindle to normal position, and means for throwing the spindle feeding gearing out of mesh simultaneously with the tripping of the trigger, substantially as described.

16. In feed mechanism for drill spindles, the combination of clutch mechanism comprising a driving member and a driven member, a shiftable member adapted upon each movement thereof to permit the driving and driven members of the clutch mechanism to rotate in unison a predetermined distance, a connection between the driven member and the drill spindle, means for initially moving the shiftable member, a latch for holding it in such shifted position, a trigger, a connection between the trigger and the latch, a movable contact actuated by the movement of the drill spindle for tripping said trigger, and a member carried by the driven clutch member for restoring the trigger and latch to normal position, substantially as described.

17. In feed mechanism for drill spindles, the combination of clutch mechanism comprising a driving member and a driven member, a shiftable member adapted upon each movement thereof to permit said driving and driven members to rotate in unison a predetermined distance, a connection between the driven member and the drill spindle, means for initially moving the shiftable member to permit the clutch mechanism to initially operate and feed the spindle down to the work, gearing for feeding the spindle during the drilling operation, means for throwing said gearing into mesh prior to the stopping of the initial movement of the clutch mechanism, a trigger, a latch for holding the shiftable member in its initially thrown position, a connection between the trigger and the latch, means for tripping the trigger after the drill has been fed a predetermined distance through the work to release the latch and allow the shiftable member to return to normal position and permit the clutch mechanism to actuate and return the spindle to normal position, means for throwing the spindle feeding gearing out of mesh simultaneously with the tripping of the trigger, and a member carried by the driven clutch member for restoring the trigger and latch to normal position, substantially as described.

18. In feed mechanism for drill spindles, the combination of clutch mechanism comprising a driving member and a driven member, a shiftable member adapted upon each movement thereof to permit said driving and driven members to rotate in unison a predetermined distance, a connection between the driven member and the drill spindle, means for initially moving the shiftable member to permit the clutch mechanism to initially act and feed the spindle down to the work, gearing for feeding the spindle during the drilling operation, means for throwing said gearing into mesh prior to the stopping of the initial movement of the clutch mechanism, a trigger, a latch for holding the shiftable member in its initially thrown position, a lever held in locked position by the trigger, a connection between said lever and said latch, means for tripping the trigger after the drill has been fed a predetermined distance through the work to release the latch and allow the shiftable member to return to normal position and permit the clutch mechanism to act and return the spindle to normal position, and a connection between said lever and the spindle driving gearing whereby said gearing is thrown out of mesh simultaneously with the tripping of said trigger, substantially as described.

19. In feed mechanism for drill spindles, the combination of clutch mechanism comprising a driving member and a driven member, a shiftable member adapted upon each movement thereof to permit said driving and driven members to rotate in unison a predetermined distance, a connection between the driven member and the drill spindle, means for initially moving the shiftable member to permit the clutch mechanism to initially act and feed the spindle down to the work, gearing for feeding the spindle during the drilling operation, means for throwing said gearing into mesh prior to the stopping of the initial movement of the clutch mechanism, a trigger, a latch for holding the shiftable member in its initially thrown position, a lever held in locked position by the trigger, a connection between said lever and said latch, means for tripping the trigger after the drill has been fed a predetermined distance through the work to release the latch and allow the shiftable member to return to normal position and permit the clutch mechanism to act and return the spindle to normal position, a connection between said lever and the spindle driving gearing whereby said gearing is thrown out of mesh simultaneously with the tripping of said trigger, and a member carried by the movable clutch member for restoring the trigger, lever and latch to normal position and to throw the spindle driving gearing into mesh.

20. In feed mechanism for drill spindles, the combination of clutch mechanism comprising a driving member and a driven member, a shiftable member adapted upon each movement thereof to permit said driving and driven members to rotate in unison a predetermined distance, a connection between the driven member and the drill spindle, means for initially moving the shiftable member to permit the clutch mechanism to initially act and feed the spindle down to the work, gearing for feeding the spindle during the drilling operation, means for throwing said gearing into mesh prior to the stopping of the initial movement of the clutch mechanism, a trigger, a latch for holding the shiftable member in its initially thrown position, a lever held in locked position by the trigger, a secondary lever for engaging the latch, a connection between the lever held by the trigger and the latch lever, means for tripping the trigger after the drill has been fed a predetermined distance through the work to release the latch and allow the shiftable member to return to normal position and permit the clutch mechanism to act and return the spindle to normal position, and a connection between said lever and the spindle driving gearing whereby said gearing is thrown out of mesh simultaneously with the tripping of said trigger, substantially as described.

21. In feed mechanism for drill spindles, the combination of clutch mechanism comprising a driving member and a driven member, a shiftable member adapted upon each movement thereof to permit said driving and driven members to rotate in unison a predetermined distance, a connection between the driven member and the drill spindle, means for initially moving the shiftable member to permit the clutch mechanism to initially act and feed the spindle down to the work, gearing for feeding the spindle during the drilling operation, means for throwing said gearing into mesh prior to the stopping of the initial movement of the clutch mechanism, a trigger, a latch for holding the shiftable member in its initially thrown position, a lever held in locked position by the trigger, a secondary lever for engaging the latch, a connection between the lever held by the trigger and the latch lever, means for tripping the trigger after the drill has been fed a predetermined distance through the work to release the latch and allow the shiftable member to return to normal position and permit the clutch mechanism to act and return the spindle to normal position, a connection between said lever and the spindle driving gearing whereby said gearing is thrown out of mesh simultaneously with the tripping of said trigger, and a member carried by the clutch mechanism for restoring the levers to normal position, substantially as described.

22. In feed mechanism for drill spindles, the combination of clutch mechanism comprising a driving member and a driven member, a shiftable member adapted upon each movement thereof to permit said driving and driven members to rotate in unison a predetermined distance, a connection between the driven member and the drill spindle, means for initially moving the shiftable member to permit the clutch mechanism to initially act and feed the spindle down to the work, gearing for feeding the spindle into the work, a trigger, a lever held in locked position by the trigger, a latch for holding the shiftable member in its thrown position, a lever for tripping said latch, a connection between said levers whereby they are moved in unison, means for tripping the trigger when the spindle has been fed a predetermined distance into the work, a crank arm carried by the lever held by the trigger, a connection between the crank arm and the spindle feeding gearing whereby said gearing is thrown in mesh when the lever held by the trigger is moved to locked position and whereby said gearing is thrown out of mesh when the trigger is tripped, substantially as described.

23. In feed mechanism for drill spindles, the combination of clutch mechanism comprising a driving member and a driven member, a shiftable member adapted upon each movement thereof to permit said driving and driven members to rotate in unison a predetermined distance, a connection between the driven member and the drill spindle, means for initially moving the shiftable member to permit the clutch mechanism to initially act and feed the spindle down to the work, gearing for feeding the spindle into the work, a trigger, a lever held in locked position by the trigger, a latch for holding the shiftable member in its thrown position, a lever for tripping said latch, a connection between said levers whereby they are moved in unison, means for tripping the trigger when the spindle has been fed a predetermined distance into the work, a crank arm carried by the lever held by the trigger, a connection between the crank arm and the spindle feeding gearing whereby said gearing is thrown in mesh when the lever held by the trigger is moved to locked position and whereby said gearing is thrown out of mesh when the trigger is tripped, and a member carried by the driven clutch member for restoring the levers to normal position, substantially as described.

ROBERT MILNE.

Witnesses:
WM. P. BOND,
FRANCES M. FROST.